US012322537B2

(12) United States Patent
Kim et al.

(10) Patent No.: US 12,322,537 B2

(45) Date of Patent: Jun. 3, 2025

(54) COIL COMPONENT AND MANUFACTURING METHOD FOR THE SAME

(71) Applicant: SAMSUNG ELECTRO-MECHANICS CO., LTD., Suwon-si (KR)

(72) Inventors: Jae Hun Kim, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/381,797

(22) Filed: Oct. 19, 2023

(65) Prior Publication Data

US 2024/0047119 A1 Feb. 8, 2024

Related U.S. Application Data

(63) Continuation of application No. 16/527,943, filed on Jul. 31, 2019, now Pat. No. 11,830,652.

(30) Foreign Application Priority Data

Mar. 6, 2019 (KR) ........................ 10-2019-0025944

(51) Int. Cl.
*H01F 27/28* (2006.01)
*H01F 41/04* (2006.01)

(52) U.S. Cl.
CPC ....... *H01F 27/2804* (2013.01); *H01F 41/041* (2013.01); *H01F 2027/2809* (2013.01)

(58) Field of Classification Search
CPC ............. H01F 17/0013; H01F 27/2804; H01F 2027/2809; H01F 17/0006; H01F 5/003;
(Continued)

(56) References Cited

U.S. PATENT DOCUMENTS 5,515,022 A * 5/1996 Tashiro ............... H01F 17/0013 336/200
9,214,270 B2 12/2015 Natanabe et al.
(Continued)

FOREIGN PATENT DOCUMENTS

CN 102403087 A 4/2012
CN 103298258 A 9/2013
(Continued)

OTHER PUBLICATIONS

Office Action issued in corresponding Korean Patent Application No. 10-2019-0025944 issued Oct. 30, 2019, with English translation.

(Continued)

*Primary Examiner* — Tszfung J Chan

(74) *Attorney, Agent, or Firm* — Morgan, Lewis & Bockius LLP

(57) ABSTRACT

A coil component and a method for manufacturing the same are provided, and the coil component includes a body portion including a magnetic material, a support member disposed in the body portion, first and second conductor patterns disposed in both sides of the support member, opposing each other, a recess portion formed in a side surface of the support member, a via conductor disposed in the recess portion and connecting the first and second conductor patterns to each other, and a via pad disposed in an end portion of each of the first and second conductor patterns to connect the first and second conductor patterns to the via conductor, and having a line width greater than line widths of the first and second conductor patterns.

13 Claims, 6 Drawing Sheets

(58) Field of Classification Search
CPC ... H01F 27/29; H01F 27/292; H01F 2017/002
USPC .................................................. 336/200, 232
See application file for complete search history.

(56) References Cited

U.S. PATENT DOCUMENTS

| | | | | |
|---|---|---|---|---|
| 9,478,334 | B2 | 10/2016 | Park et al. | |
| 9,875,837 | B2 | 1/2018 | Jeong et al. | |
| 2012/0062348 | A1 | 3/2012 | Hashimoto | |
| 2013/0300529 | A1 | 11/2013 | Chang et al. | |
| 2014/0022041 | A1* | 1/2014 | Park | H01F 5/00 336/199 |
| 2014/0266547 | A1* | 9/2014 | Watanabe | H01F 41/042 336/200 |
| 2014/0347825 | A1 | 11/2014 | Guo et al. | |
| 2016/0078986 | A1 | 3/2016 | Yoon et al. | |
| 2016/0111194 | A1* | 4/2016 | Jeong | H01F 17/06 336/200 |
| 2016/0307689 | A1 | 10/2016 | Jeong et al. | |
| 2016/0351321 | A1* | 12/2016 | Lyoo | H01F 41/041 |
| 2017/0178789 | A1 | 6/2017 | Kim et al. | |
| 2017/0178798 | A1 | 6/2017 | Yoon et al. | |
| 2017/0200551 | A1 | 7/2017 | Paeng et al. | |
| 2017/0287621 | A1 | 10/2017 | Seino et al. | |
| 2018/0047494 | A1* | 2/2018 | Yoon | H01F 41/0233 |
| 2018/0358171 | A1 | 12/2018 | Jung et al. | |
| 2019/0088407 | A1 | 3/2019 | Jung et al. | |

FOREIGN PATENT DOCUMENTS

| | | | | | |
|---|---|---|---|---|---|
| CN | 103578708 | A | | 2/2014 | |
| CN | 104051125 | A | | 9/2014 | |
| CN | 105225793 | A | | 1/2016 | |
| CN | 106898479 | A | | 6/2017 | |
| CN | 109087775 | A | | 12/2018 | |
| JP | 2000196240 | A | * | 7/2000 | |
| JP | 2005217256 | A | * | 8/2005 | |
| JP | 2017-183663 | A | | 10/2017 | |
| JP | 2018056505 | A | * | 4/2018 | H01F 17/0013 |
| KR | 10-2016-0123657 | A | | 10/2016 | |
| KR | 10-2017-0073167 | A | | 6/2017 | |
| KR | 10-1823199 | B1 | | 1/2018 | |
| KR | 10-1832587 | B1 | | 2/2018 | |
| KR | 10-1987213 | B1 | | 6/2019 | |

OTHER PUBLICATIONS

Chinese Office Action dated Jan. 19, 2023, issued in corresponding Chinese Patent Application No. 201911131790.6 (with English translation).

Chinese Office Action dated Jul. 21, 2023, issued in corresponding Chinese Patent Application No. 201911131790.6.

U.S. Notice of Allowance dated Jul. 26, 2023, issued in corresponding U.S. Appl. No. 16/527,943.

* cited by examiner

COIL COMPONENT AND MANUFACTURING METHOD FOR THE SAME

CROSS-REFERENCE TO RELATED APPLICATION(S)

This application is the continuation application of U.S. patent application Ser. No. 16/527,943 filed on Jul. 31, 2019, which claims the benefit of priority to Korean Patent Application No. 10-2019-0025944 filed on Mar. 6, 2019 in the Korean Intellectual Property Office, the entire disclosure of which is incorporated herein by reference.

TECHNICAL FIELD

The present disclosure relates to a coil component and a method for manufacturing the same.

BACKGROUND

With the recent development of portable wireless communications devices and wearable devices, there has been demand for high-performance lightweight, small-sized components. Particularly, as the frequency of use of the latest portable smartphones and wearable devices becomes higher, a stable power supply is required in the used frequency range. Accordingly, a power inductor having a function of suppressing a sudden change in current in a power terminal is required to be used at a higher frequency and at a higher current with the development of smartphones and wearable devices. Moreover, a thin film high frequency inductor is applied to a signal terminal of a high-frequency circuit to be used as a noise filter.

Meanwhile, in the case of such a thin film power inductor, a via for current carrying between coil layers is provided. In this case, in order to secure alignment between a via and a coil, a via pad is formed to be larger than ends of the innermost peripheral portion of the conductor pattern. However, there may be a problem in securing a core portion area such as the occurrence of excessive plating due to a size of a via pad being greater than a line width of a coil pattern.

SUMMARY

An aspect of the present disclosure is to provide a coil component, capable of improving DC resistance characteristics (Rdc) by implementing a higher capacity coil component by increasing an volume of a core portion, and a method for effectively manufacturing the same.

According to an aspect of the present disclosure, a coil component may include a body portion including a magnetic material, a support member disposed in the body portion, and first and second conductor patterns disposed in both sides of the support member, opposing each other, wherein the support member has a recess portion formed in a side surface thereof, a via conductor is disposed in the recess portion and connects the first and second conductor patterns to each other, and each of the first and second conductor patterns includes a via pad disposed in an end portion thereof to connect the first and second conductor patterns to the via conductor, the via pad having a line width greater than line widths of other portions of the first and second conductor patterns.

According to another aspect of the present disclosure, a method for manufacturing a coil component may include forming a coil portion, forming a body portion embedding the coil portion, and forming an electrode portion on the body portion, wherein the forming a coil portion includes: preparing a support member; forming a recess portion penetrating through the support member; forming a first partition wall and a second partition wall on the first surface and the second surface of the support member, respectively, each of the first partition wall and the second partition wall having an opening in a plane coil shape; forming first and second coil layers having first and second conductor patterns in a plane coil shape on the first surface and the second surface of the support member, respectively, by filling openings of the first and second partition walls with a conductor; forming a via conductor disposed in the recess portion to connect the first and second conductor patterns to each other, and having one side surface which is in contact with an inner wall of the recess portion, and another side surface which is not in contact with the inner wall of the recess portion; forming a via pad disposed in an end portion of each of the first and second conductor patterns to connect the first and second conductor patterns to the via conductor, the via pad having a line width greater than line widths of other portions of the first and second conductor patterns; and removing the first and second partition walls.

According to another aspect of the present disclosure, a coil component may include: a body portion including a magnetic material; a support member disposed in the body portion; and first and second conductor patterns disposed on both sides of the support member, opposing each other, wherein each of the first and second conductor patterns includes a via pad at an inner end thereof, a line width of the via pad being greater than line widths of other portions of the first and second conductor patterns, each via pad of the first and second conductor patterns are connected to each other through a via conductor which penetrates a portion of the support member, and a cross-sectional shape of the via conductor in a plane perpendicular to a staking direction of the of the first and second conductor patterns is a half-circle.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
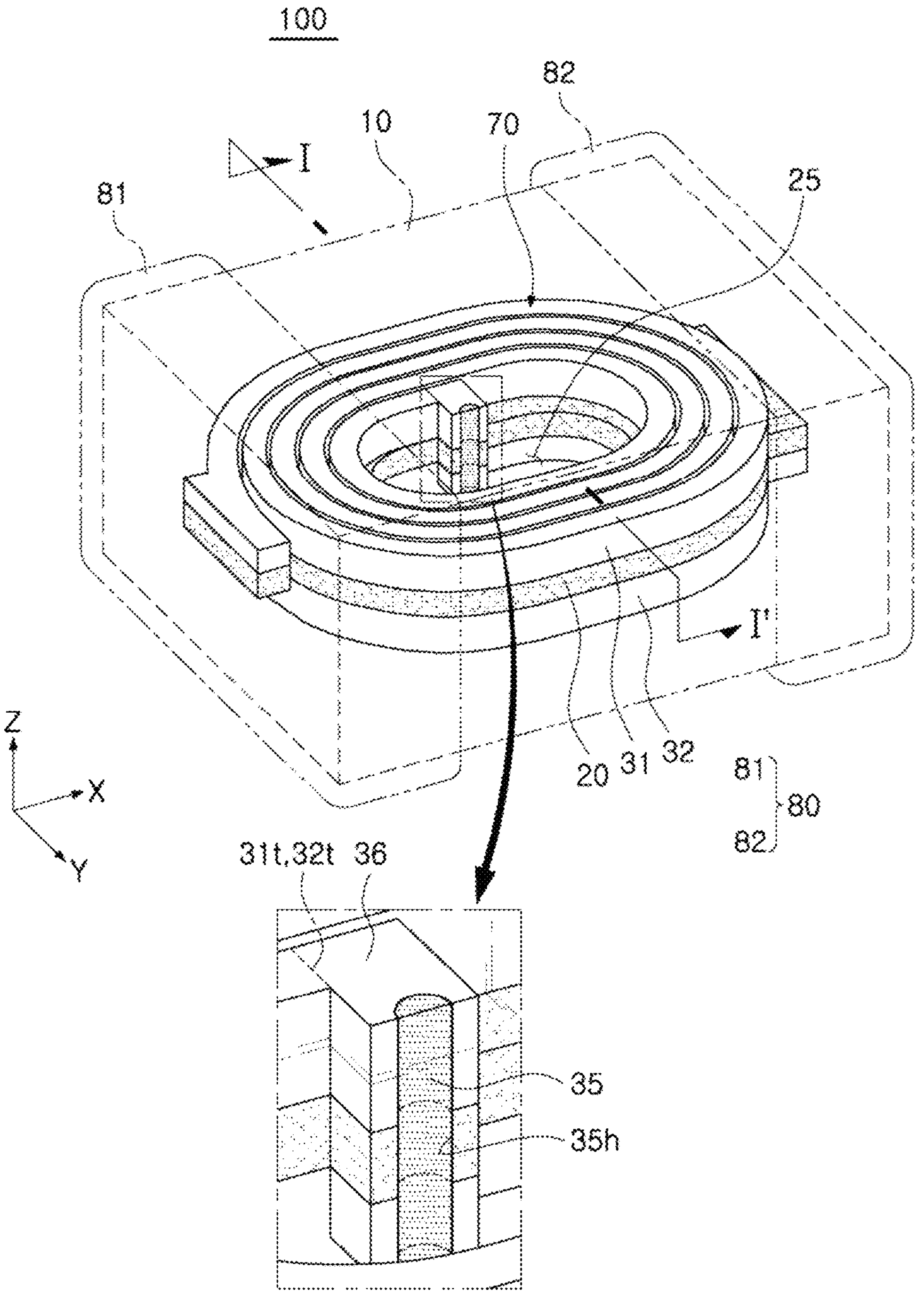
FIG. 1 is a schematic perspective view illustrating a coil component according to an exemplary embodiment of the present disclosure.

Hereinafter, various exemplary embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various exemplary embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

In the drawings, the X direction may be defined as a first direction or a longitudinal direction, the Y direction may be defined as a second direction or a width direction, and the Z direction may be defined as a third direction or a thickness direction.

Hereinafter, a coil component according to an exemplary embodiment of the present disclosure will be described in detail with reference to the accompanying drawings. Referring to the accompanying drawings, the same or corresponding components are denoted by the same reference numerals, and duplicate descriptions thereof will be omitted.

Various types of electronic components are used in electronic devices. Here, various types of coil components may be suitably used for the purpose of noise removal or the like among these electronic components.

In other words, a coil component in an electronic device may be used as a power inductor, a high frequency (HF) inductor, a general bead, a GHz bead, a common mode filter, or the like.

Coil Component

First Embodiment

FIG. 1 is a schematic perspective view illustrating an example of a coil component according to an exemplary embodiment of the present disclosure.

Figure 2:
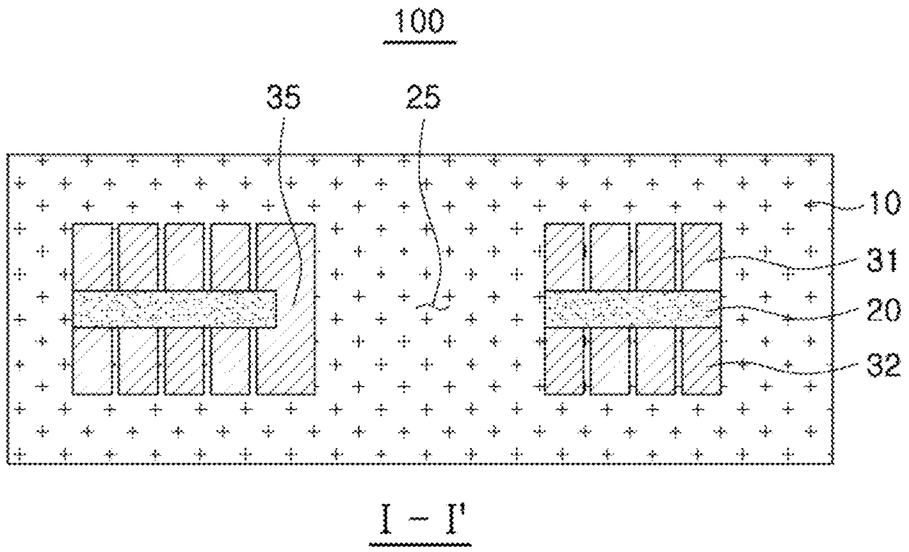
FIG. 2 is a schematic view illustrating a cross-section taken along line I-I' of the coil component of FIG. 1.

FIG. 2 is a schematic view illustrating an example of a cross-section taken along line I-I' of the coil component of FIG. 1.

Figure 4:
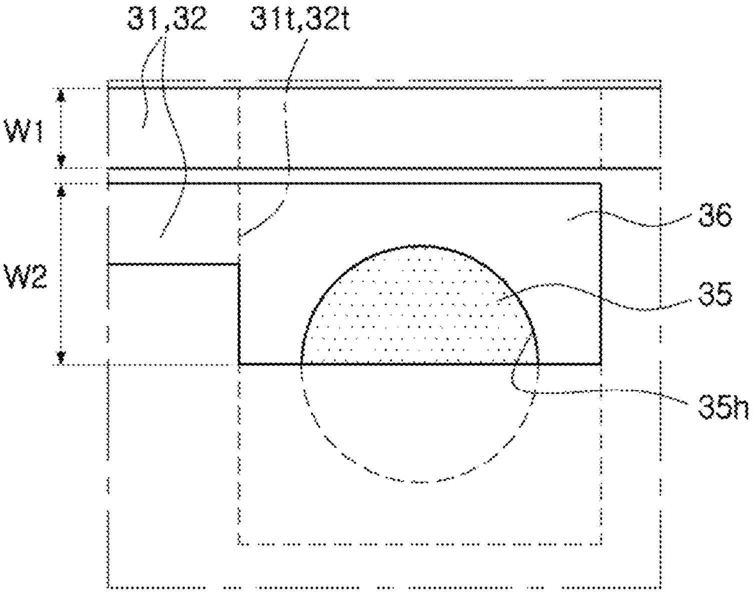
FIG. 4 is a schematic plan view illustrating a coil portion before trimming of the coil component of FIG. 2.

FIG. 4 is a schematic plan view illustrating an example in which a coil portion before trimming of the coil component of FIG. 2.

Referring to FIGS. 1, 2, and 4, a coil component 100 according to an example includes a body portion 10, a support member 20, conductor patterns 31 and 32, a recess portion 35*h*, a via conductor 35, and a via pad 36, and may further include a through-hole 25.

The body portion 10 may form the appearance of the coil component 100, and may include a first surface and a second surface opposing each other in a first direction, a third surface and a fourth surface opposing each other in a second direction, and a fifth surface and a sixth surface opposing each other in a third direction. The body portion 10 may be hexahedral, but is not limited thereto. The body portion 10 includes a magnetic material having magnetic characteristics. For example, the body portion 10 may be formed by filling a resin with ferrite or metallic magnetic particles. The ferrite may be a material, for example, Mn—Zn-based ferrite, Ni—Zn-based ferrite, Ni—Zn—Cu-based ferrite, Mn—Mg-based ferrite, Ba-based ferrite, Li-based ferrite, or the like. The metal magnetic particles may include at least one or more selected from the group consisting of iron (Fe), silicon (Si), chromium (Cr), aluminum (Al), and nickel (Ni). For example, the metal magnetic particles may be Fe—Si—B—Cr-based amorphous metal, but is not necessarily limited thereto. A diameter of metal magnetic particles may be about 0.1 μm to 30 μm. The body portion 10 may have a form in which the ferrite or the metal magnetic particles are dispersed in a thermosetting resin such as an epoxy resin or a polyimide resin.

A magnetic material of the body portion 10 may be formed of a magnetic resin composite in which metal magnetic powder and a resin mixture are mixed. The metal magnetic powder may include iron (Fe), chromium (Cr), or silicon (Si) as a main element, and may include, for example, iron (Fe)-nickel (Ni), iron (Fe), iron (Fe)-chromium (Cr)-silicon (Si), or the like, but is not limited thereto. The resin mixture may include epoxy, polyimide, a liquid crystal polymer (LCP), and the like, but is not limited thereto. The metal magnetic powder may be filled with metal magnetic powder having at least two or more average particle diameters. In this case, bimodal metal magnetic powder having different sizes is used and pressed, so the magnetic resin composite may be fully filled, and thus a filling rate may be increased.

The support member 20 may be an insulating substrate formed of an insulating resin. In this case, the insulating resin may include a thermosetting resin such as an epoxy resin, a thermoplastic resin such as a polyimide, or a resin in which a stiffener such as a glass fiber or an inorganic filler is impregnated such as a pre-preg, an Ajinomoto build-up film (ABF), a FR-4 resin, a bismaleimide triazine (BT) resin, or a photoimageable dielectric (PID) resin. When the support member 20 includes a glass fiber, rigidity of the support member may be more excellent. In some cases, a ferrite substrate, a metal soft magnetic substrate, or the like, may be used as the support member 20.

The first conductor pattern 31 may have a plane coil shape. The first conductor pattern may be a plating pattern formed using a plating method according to the related art, but is not limited thereto. The first conductor pattern may have at least 2 or more turns, so the first conductor pattern may be thin while having high inductance. The first conductor pattern may include a seed layer and a plated layer. The seed layer may be formed of a plurality of layers. Here, the seed layer may include an adhesive layer including, for example, one or more among titanium (Ti), titanium-tungsten (Ti—W), molybdenum (Mo), chromium (Cr), nickel (Ni), and nickel (Ni)-chromium (Cr), and a base plated layer disposed on the adhesive layer and including the same material as a plated layer, for example, copper (Cu), but is not limited thereto. The plated layer may include a conductive material, such as copper (Cu), aluminum (Al), silver (Ag), tin (Sn), gold (Au), nickel (Ni), lead (Pb), or alloys thereof, and may include copper (Cu) in general, but is not limited thereto.

An aspect ratio, a ratio of a height to a width of the first conductor pattern, may be about 3 to 9. One among main characteristics of a coil component, for example, such as an inductor is DC resistance (Rdc) characteristics, which becomes lowered when a cross-sectional area of a coil is larger. Moreover, as an area of a magnetic region in a body, through which magnetic flux passes, is increased, the inductance is increased. Thus, in order to improve inductance while lowering DC resistance (Rdc), it is necessary to increase an area of a magnetic region while increasing a cross-sectional area of a coil. In order to increase a cross-sectional area of a coil, there are two methods, a method for increasing a width of a conductor pattern and a method for increasing a thickness of a conductor pattern. However, when a width of a conductor pattern is simply increased, a short between coil patterns may occur. Moreover, there is a limit in the number of turns of the conductor pattern to be implemented, leading to a reduction in an area occupied by a magnetic region. Thus, the efficiency is reduced and there may be a limitation in the implementation of a high-capacity product. On the other hand, when a conductor pattern having a high aspect ratio is implemented by increasing a thickness of the conductor pattern, rather than increasing a width of the conductor pattern, the problem described above may be solved. Moreover, as described later in the present disclosure, an opening pattern is formed in a resist first, and the opening pattern is used as a plating growth guide. In this regard, a shape of a coil conductor may be easily adjusted. However, if an aspect ratio is significantly high, implementation may be difficult. In addition, a volume of a magnetic material, disposed on the first conductor pattern, is reduced, so the inductance may be adversely affected.

The second conductor pattern 32 may have a plane coil shape. The second conductor pattern may be a plating pattern formed using a plating method according to the related art, but is not limited thereto. The second conductor pattern may have at least 2 or more turns, so the second conductor pattern may be thin while having high inductance. The second conductor pattern may include a seed layer and a plated layer. The seed layer may be formed of a plurality of layers. Here, the seed layer may include an adhesive layer including, for example, one or more among titanium (Ti), titanium-tungsten (Ti—W), molybdenum (Mo), chromium (Cr), nickel (Ni), and nickel (Ni)-chromium (Cr), and a base plated layer disposed on the adhesive layer and including the same material as a plated layer, for example, copper (Cu), but is not limited thereto. The plated layer may include a conductive material, such as copper (Cu), aluminum (Al), silver (Ag), tin (Sn), gold (Au), nickel (Ni), lead (Pb), or alloys thereof, and may include copper (Cu) in general, but is not limited thereto.

An aspect ratio, a ratio of a height to a width of the second conductor pattern, may be about 3 to 9. One among main characteristics of a coil component, for example, such as an inductor is DC resistance (Rdc) characteristics, which becomes lowered when a cross-sectional area of a coil is larger. Moreover, as an area of a magnetic region in a body, through which magnetic flux passes, is increased, the inductance is increased. Thus, in order to improve inductance while lowering DC resistance (Rdc), it is necessary to increase an area of a magnetic region while increasing a cross-sectional area of a coil. In order to increase a cross-sectional area of a coil, there are two methods, a method for increasing a width of a conductor pattern and a method for increasing a thickness of a conductor pattern. However, when a width of a conductor pattern is simply increased, a short between coil patterns may occur. Moreover, there is a limit in the number of turns of the conductor pattern to be implemented, leading to a reduction in an area occupied by a magnetic region. Thus, the efficiency is reduced and there may be a limitation in the implementation of a high-capacity product. On the other hand, when a conductor pattern having a high aspect ratio is implemented by increasing a thickness of the conductor pattern, rather than increasing a width of the conductor pattern, the problem described above may be solved. Moreover, as described later in an exemplary embodiment of the present disclosure, an opening pattern is formed in a resist first, and the opening pattern is used as a plating growth guide. In this regard, a shape of a coil conductor may be easily adjusted. However, if an aspect ratio is significantly high, implementation may be difficult. In addition, a volume of a magnetic material, disposed on the second conductor pattern, is reduced, so the inductance may be adversely affected.

The recess portion 35*h* may have a spherical shape, and may be disposed in ends 31*t* and 32*t* of the innermost peripheral portions of the first and second conductor patterns 31 and 32. The recess portion 35*h* may pass through the support member 20, and at least a portion of a side surface may be open. The recess portion 35*h* may have a structure of being extended in ends 31*t* and 32*t* of the innermost peripheral portions of the first and second conductor patterns 31 and 32, and a portion of a side surface of the recess portion 35*h* may pass through an inner wall of the via pad 36, which will be described later.

The recess portion 35*h* may pass through a region partially overlapping the support member 20 and the via pad 36, and thus may have a spherical shape. However, as will be described later, the recess portion is trimmed with the via pad 36. Thus, in a final structure of a coil component, the recess portion 35*h* may have a cut spherical shape, but is not limited thereto. The recess portion 35*h* is formed to pass through the support member 20. Here, in a final structure, the through-hole 25 and the recess portion 35*h* are connected to each other to form a single hole.

As will be described later, the via conductor 35 is disposed along a wall of the recess portion 35*h* to fill the recess portion 35*h* of the via pad 36. The via conductor 35 is connected to ends 31*t* and 32*t* of the first and second conductor patterns. Thus, due to an increase in a contact area between a conductor pattern and a via conductor, reliability of interlayer conduction may be improved. Moreover, due to an increase in an interlayer conducting area, a current path is increased to reduce DC resistance (Rdc), so coil characteristics may be improved.

The via conductor 35 may electrically connect the first conductor pattern 31 and the second conductor pattern 32 to each other, resulting in forming a single coil rotating in the same direction. The via conductor 35 may be formed by plating along a wall of the recess portion 35*h* passing through the support member 20. The via conductor 35 may integrally fill the recess portions 35*h* of the support member 20 and the via pad 36. The via conductor 35 may be disposed in the recess portion 35*h* and connect the first and second conductor patterns 31 and 32 to each other, and may include one side surface, in contact with an inner wall of the recess portion 35*h,* and the other side surface, not in contact with the inner wall of the recess portion 35*h*. The first conductor pattern 31 and the second conductor pattern 32 as well as the via conductor 35 may be simultaneously formed, resulting in integration thereof. The via conductor 35 may be also formed of a via seed layer and a via plated layer. The via seed layer may be formed of a plurality of layers. Here, the via seed layer may include a via adhesive layer including, for example, one or more among titanium (Ti), titanium-tungsten (Ti—W), molybdenum (Mo), chromium (Cr), nickel (Ni), and nickel (Ni)-chromium (Cr), and a via base plated layer disposed on the via adhesive layer and including the same material as a via plated layer, for example, copper (Cu), but is not limited thereto. The via plated layer may include a conductive material, such as copper (Cu), aluminum (Al), silver (Ag), tin (Sn), gold (Au), nickel (Ni), lead (Pb), or alloys thereof, and may include copper (Cu) in general, but is not limited thereto.

The via conductor 35 is disposed along a wall of the recess portion 35*h* to be connected to the ends 31*t* and 32*t* of the first and second conductor patterns. Thus, due to an increase in a contact area between a conductor pattern and a via conductor, reliability of interlayer conduction may be improved. Moreover, due to an increase in an interlayer conducting area, a current path is increased to reduce DC resistance (Rdc), so coil characteristics may be improved.

As will be described later, a via pad 36, disposed in an innermost side of the core portion 71, and a via conductor 35, subsided in the via pad 36, may be processed into various shapes by a trimming process. A portion of the via pad 36, protruding to an innermost side of the core portion 71, may be processed. Here, when viewed from the top surface of the via pad 36, the via conductor 35 may have a semicircular shape, but is not limited thereto.

The via pad 36 may be disposed in the ends 31*t* and 32*t,* connected to the first and second conductor patterns 31 and 32 to connect the first and second conductor patterns 31 and 32 to the via conductor 35. The recess portion 35*h* may be disposed to pass through an inner wall of the via pad 36, so that a portion of a side surface of the recess portion is open. A line width W2 of the via pad 36 may be greater than a line width W1 of an innermost peripheral pattern of each of the first and second conductor patterns 31 and 32. In other words, the first and second conductor patterns 31 and 32 have a via pad 36 having an area, larger than an area of the via conductor 35. As an example, a cross-sectional area of the via pad 36 may be 4 to 5 times a cross-sectional area of the recess portion 35*h,* occupied by the via conductor 35.

According to the miniaturization of the coil component, an area of the core portion 71 of the coil, occupied by the via pad 36, may become relatively large. For example, in the case of a coil component in which the number of turns of a conductor pattern is 13.5, an area of the via pad 36 occupies about 6% of an area of the core portion 71. As an area, occupied by the via pad 36, is relatively increased, the excessive plating may occur and the plating dispersion may be increased. However, in order to manufacture a small coil component, a size of the via pad 36 formed therein is required to be reduced. In this regard, as will be described later, portions, of the support member 20 and the via pad 36, protruding to an innermost side of the core portion 71, are processed to reduce a size of the via pad 36. By processing of the via pad 36, in a coil component in which a line width W1 of the via pad 36 is greater than line widths W2 of the ends 31*t* and 32*t* of the first and second conductor patterns, an area, occupied by a via pad, may be significantly reduced. A shape of the via pad 36 after trimming is not limited, but the shape of the via pad may be processed to have a quadrangular shape having a straight line portion according to a trimmed region.

Since the via pad 36 allows the first conductor pattern 31 and the second conductor pattern 32 to be connected to the via conductor 35, the via pad may include a conductive material, such as copper (Cu), aluminum (Al), silver (Ag), tin (Sn), gold (Au), nickel (Ni), lead (Pb), or alloys thereof, and may include copper (Cu) in general, but is not limited thereto.

Second Embodiment

Figure 5:
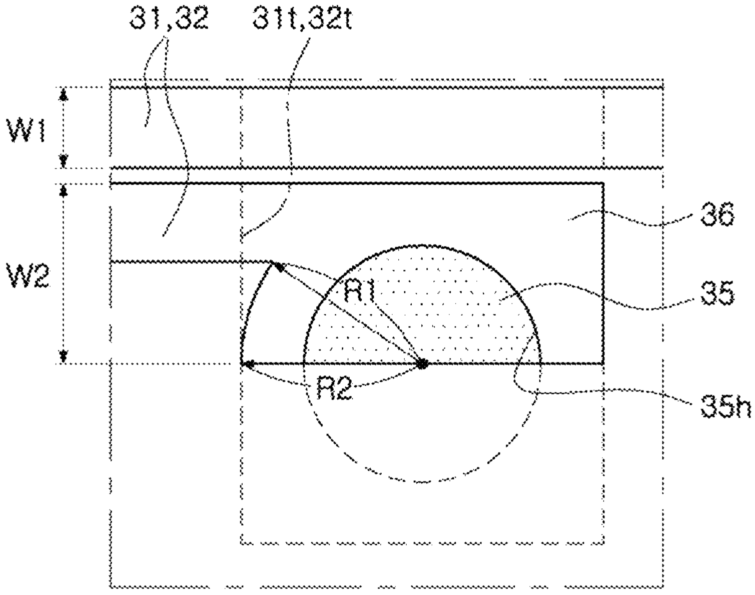
FIG. 5 is a schematic plan view illustrating a coil portion before trimming of the coil component of FIG. 2.

FIG. 5 is a schematic plan view illustrating an example in which a coil portion before trimming of the coil component of FIG. 2.

Figure 6:
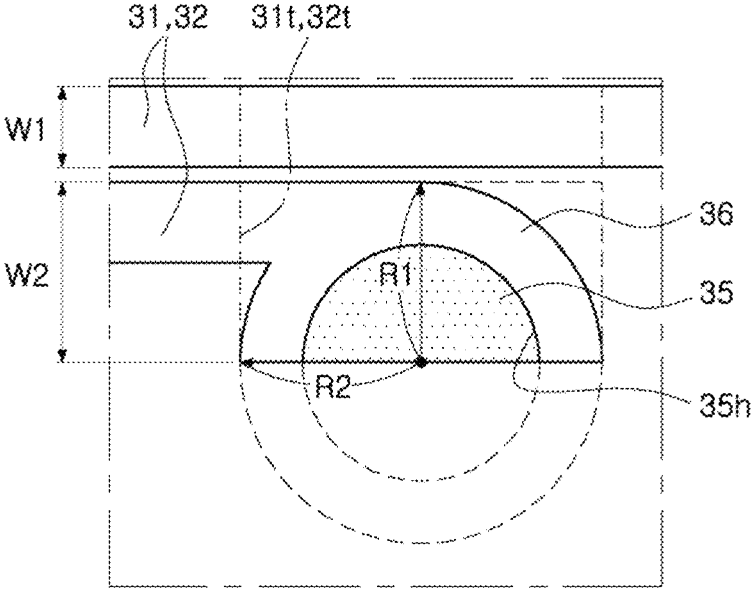
FIG. 6 is a schematic plan view illustrating a coil portion before trimming of the coil component of FIG. 2.

FIG. 6 is a schematic plan view illustrating an example in which a coil portion before trimming of the coil component of FIG. 2.

Referring to FIGS. 1 to 4, a coil component 100 according to an exemplary embodiment of the present disclosure may have a via pad 36 of which a shape of an upper surface is different as compared with the coil component 100 according to a first embodiment. Thus, in describing an embodiment, a shape of an upper surface of a via pad 36, different from that of a first embodiment, will be only described. The description of a first embodiment may be applied to other configurations of an embodiment as it is.

Referring to FIGS. 5 and 6, the via pad 36 may be disposed in the ends 31*t* and 32*t,* connected to the first and second conductor patterns 31 and 32 to connect the first and second conductor patterns 31 and 32 to the via conductor 35. A line width W2 of the via pad 36 may be greater than a line width W1 of an innermost peripheral pattern of each of the first and second conductor patterns 31 and 32. In other words, the first and second conductor patterns 31 and 32 have a via pad 36 having an area, larger than an area of the via conductor 35. As an example, a cross-sectional area of the via pad 36 may be 4 to 5 times a cross-sectional area of the recess portion 35*h*, occupied by the via conductor 35. According to the miniaturization of the coil component, an area of the core portion 71 of the coil, occupied by the via pad 36, may become relatively large. For example, in the case of a coil component in which the number of turns of a coil pattern is 13.5, an area of the via pad 36 occupies about 6% of an area of the core portion 71. As an area, occupied by the via pad 36, is relatively increased, the excessive plating may occur and the plating dispersion may be increased. However, in order to manufacture a small coil component, a size of the via pad 36 formed therein is required to be reduced. In this regard, as will be described later, portions, of the support member 20 and the via pad 36, protruding to an innermost side of the core portion 71, are processed to reduce a size of the via pad 36. By processing of the via pad 36, in a coil component in which a line width W1 of the via pad 36 is greater than line widths W2 of the ends 31*t* and 32*t* of the first and second conductor patterns, an area, occupied by a via pad, may be significantly reduced.

The via pad 36, disposed in an innermost side of the core portion 71, and a via conductor 35, subsided in the via pad 36, may be processed into various shapes by a trimming process, which will be described later. Portions of the support member 20 and the via pad 36, protruding to an innermost side of the core portion 71, may be processed, and the via conductor 35 may have a semicircular shape, but is not limited thereto. As an example, an upper surface of the via pad 36 may be processed to a corner portion formed by a circular arc, and a straight line portion connecting the corner portion. In addition, a plurality of corner portions, formed in the via pad 36, may have the same radius of curvature R1 and R2.

Since the via pad 36 allows the first conductor pattern 31 and the second conductor pattern 32 to be connected to the via conductor 35, the via pad may include a conductive material, such as copper (Cu), aluminum (Al), silver (Ag), tin (Sn), gold (Au), nickel (Ni), lead (Pb), or alloys thereof, and may include copper (Cu) in general, but is not limited thereto.

Method for Manufacturing Coil Component

Figure 3A:
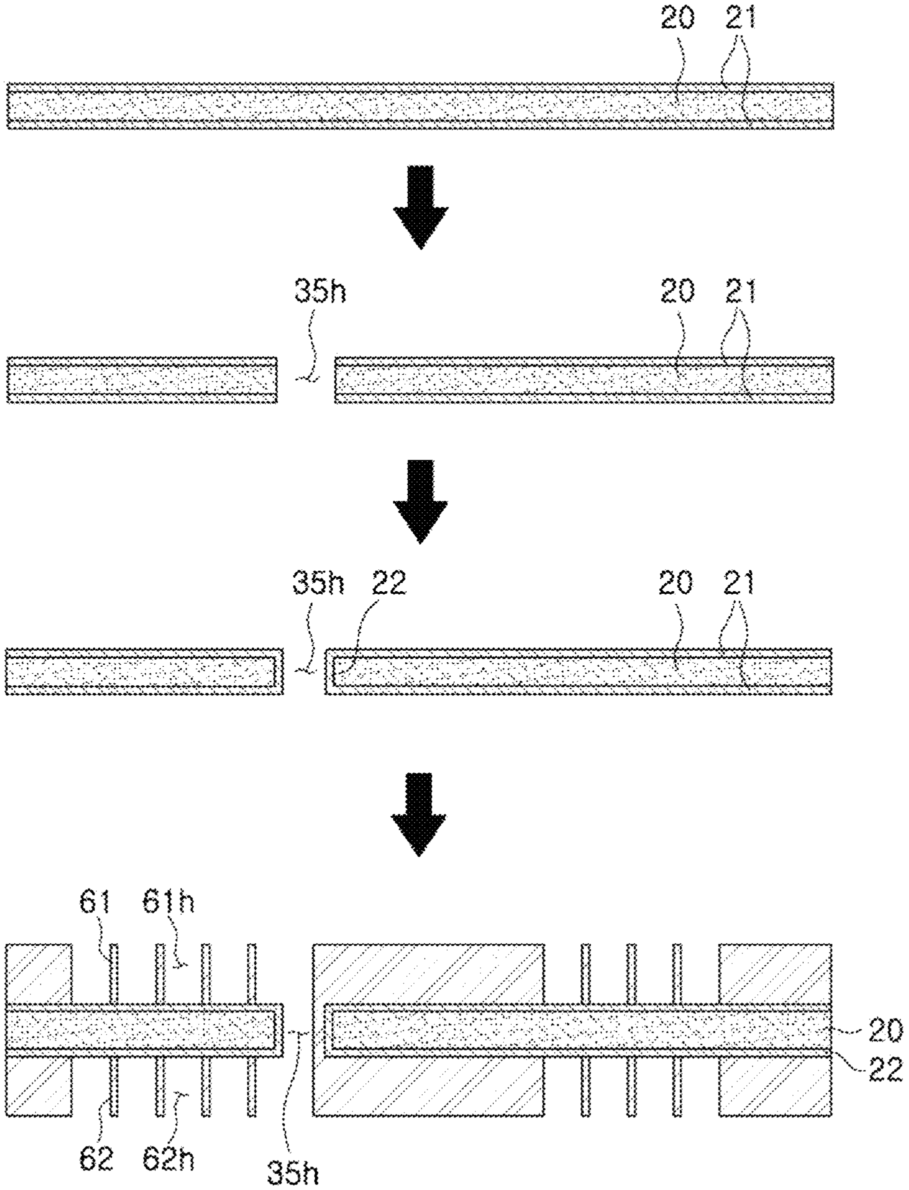
FIGS. 3A and 3B are schematic views illustrating a manufacturing process of the coil component of FIG. 2.
Figure 3B:
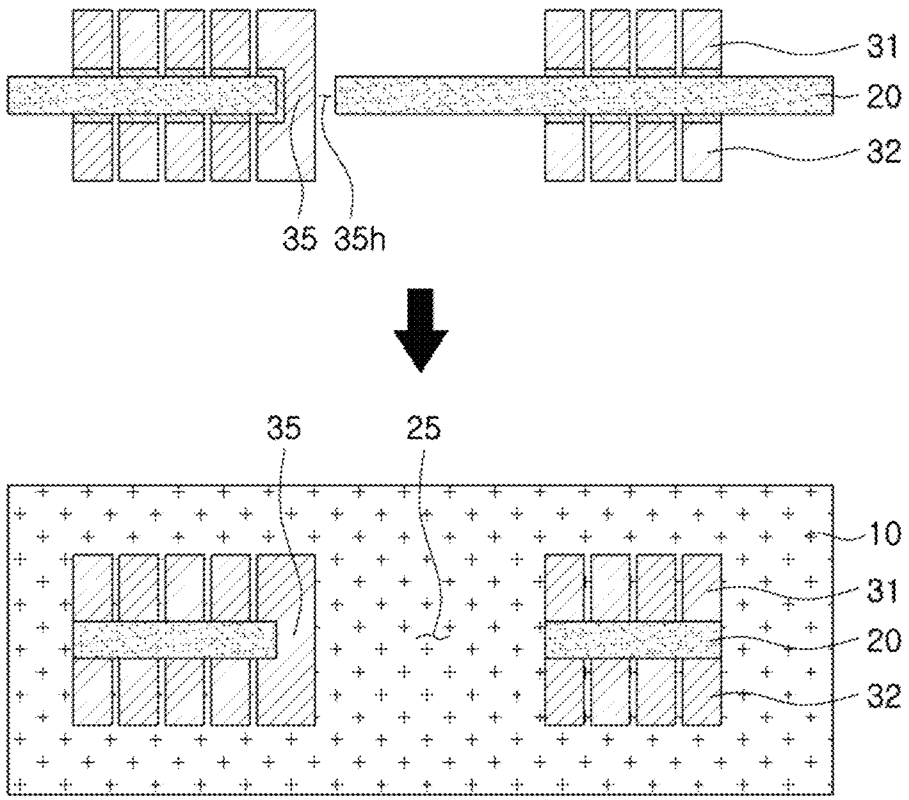

FIGS. 3A and 3B are schematic views illustrating a manufacturing process of the coil component of FIG. 1.

Referring to FIG. 3A, a support member 20 is prepared first. The support member 20 may be a copper clad laminate (CCL) according to the related art, or the like. In this case, a thin copper foil 21 may be formed on upper and lower surfaces. Then, a recess portion 35*h* is formed in the support member 20. The recess portion 35*h* may be formed using a mechanical drill and/or a laser drill. Then, a seed layer 22 is formed on upper and lower surfaces of the support member 20 and a wall of the recess portion 35*h*. The seed layer may be formed using a known method. For example, the seed layer may be formed using chemical vapor deposition (CVD), Physical Vapor Deposition (PVD), sputtering, or the like, using a dry film, but is not limited thereto. Then, a first partition wall 61 and a second partition wall 62 are formed upper and lower surfaces of the support member 20, respectively. Each of the first and second partition walls 61 and 62 may be a resist film, and may be formed using a method of laminating and then curing a resist film, or a method of applying and hardening a resist film material, but it is not limited thereto. A laminating method may include, for example, a method of hot pressing a precursor, cooling the hot pressed precursor using a cold press, and separating a tool from the cooled precursor, or the like, the hot pressing including pressurizing the precursor at high temperatures for a certain period of time, depressurizing the pressurized precursor, and cooling the depressurized precursor to room temperature. As the method of applying the material, for example, a screen printing method of applying ink with a squeegee, a spray printing method of applying ink in a mist form, or the like, may be used. The hardening process as a post-process may be a process of drying the material so as not to be completely cured in order to use a photolithography method, or the like. The first and second partition walls 61 and 62 have first and second openings 61*h* and 62*h*, having a plane coil shape, respectively. The first and second openings 61*h* and 62*h* may be processed using a known photolithography method, that is, a known exposure and development method, may be sequentially patterned, or may be patterned at once. The exposure machine or developer is not particularly limited, and an appropriate one may be selected depending on a photosensitive material to be used.

Referring to FIG. 3B, then, openings 61*h* and 62*h* of the first and second partition walls 61 and 62 are used as a plating growth guide, and first and second coil layers 31 and 32 and a via conductor 35 are formed on the seed layer 22. The via conductor 35 may be disposed in the recess portion 35*h* and connect the first and second conductor patterns 31 and 32 to each other, and may have one side surface, in contact with an inner wall of the recess portion 35*h*, and the other side surface, not in contact with the inner wall of the recess portion 35*h*. As described above, an opening pattern is formed in an insulator first, and then the opening pattern is used as a guide to perform plating. In this regard, in a manner different from the anisotropic plating technology according to the related art, a shape of a coil conductor is easily adjusted. In other words, each of the first and second conductor patterns 31 and 32, to be formed, has a flat side surface, in contact with each of the first and second partition walls 61 and 62. Here, the meaning of being flat is not only completely flat, but also is substantially flat. In other words, considering that a wall of the opening pattern is partially uneven by photolithography. A plating method is not particularly limited, and may be electrolytic plating, electroless plating, and the like, but it is not limited thereto. The first and second conductor patterns 31 and 32 as well as the via conductor 35 are formed, and then the first and second partition walls 61 and 62 are removed. The first and second partition walls 61 and 62 may be removed using a known stripping solution. The via pad 36 may be disposed in each of the ends 31*t* and 32*t* of the first and second conductor patterns 31 and 32 to connect the first and second conductor patterns 31 and 32 to the via conductor 35. A line width W2 of the via pad 36 may be greater than a line width W1 of each of the first and second conductor patterns 31 and 32. Then, through a trimming process, a through-hole 25, passing through the support member 20, is formed. The via pad 36, disposed in an innermost side of the core portion 71, and a via conductor 35, subsided in the via pad 36, may be processed into various shapes by the trimming process. A portion of the via pad 36, protruding to an innermost side of the core portion 71, may be processed using a trimming process, and the via conductor 35 may have a semicircular shape, but is not limited thereto. As an example, an upper surface of the via pad 36 may be processed to have a corner portion formed by a circular arc, and a straight line shape connecting the corner portion. In addition, a plurality of corner portions, formed in the via pad 36, may have the same radius of curvature R1 and R2.

A portion of the through-hole 25, blocked by the partition walls 61 and 62, is removed by laser trimming, and the through-hole 25 is also formed using a mechanical drill and/or a laser drill. The through-hole 25 may be connected to the recess portion 35*h* to form a single hole. In a trimming process, not only such a center portion is formed, but also the through-hole 25 may be formed in an outer portion. In other words, in a trimming process, the through-hole 25 may be formed in a center portion and an outer portion to allow the support member 20 to have a shape corresponding to a plane shape of the first and second conductor patterns 31 and 32. Such a through-hole 25 may be filled with a magnetic material, so more excellent coil characteristics may be implemented. Then, an insulating film (not shown) is formed. The insulating film (not shown) coating may be performed using chemical vapor deposition (CVD). Then, a magnetic sheet is stacked on upper and lower portions of the coil portion 70, having been manufactured, to form a body portion 10. Then, an electrode portion 80 is formed on the body portion 10, having been formed.

As set forth above, according to an exemplary embodiment in the present disclosure, a coil component, capable of improving DC resistance characteristics (Rdc) by implementing a higher capacity coil component by increasing an volume of a core portion in a coil component having a reduced size, and a method for effectively manufacturing the same are provided.

While exemplary embodiments have been shown and described above, it will be apparent to those skilled in the art that modifications and variations could be made without departing from the scope of the present invention as defined by the appended claims.

What is claimed is:

1. A coil component, comprising:

a body portion including a magnetic material;

a support member disposed in the body portion; and first and second conductor patterns disposed on both sides of the support member, opposing each other, wherein the support member has a protrusion portion protruding from a side surface of the support member and a recess portion disposed in the protrusion portion, a via conductor is disposed in the recess portion and connects the first and second conductor patterns to each other, each of the first and second conductor patterns includes a via pad disposed in an end portion thereof to connect the first and second conductor patterns to the via conductor, and in a cross-sectional view of the via conductor from a stacking direction, a boundary between the via conductor and the recess portion includes a curved line, and a boundary between the via conductor and the body portion includes a straight line.

2. The coil component of claim 1, wherein the via pad of one of the first and second conductor patterns has a recess portion in which a portion of the side surface is open.

3. The coil component of claim 2, wherein the via conductor is disposed in the recess portion of the support member and the recess portion of the via pad of one of the first and second conductor patterns, as one integral piece.

4. The coil component of claim 1, wherein the via conductor has one side surface which is in contact with an inner wall of the recess portion, and another side surface which is not in contact with the inner wall of the recess portion.

5. The coil component of claim 2, wherein the via conductor is disposed in the recess portion of the via pad of one of the first and second conductor patterns.

6. The coil component of claim 1, wherein a cross-sectional area of the via pad of one of the first and second conductor patterns is 4 to 5 times a cross-sectional area of the via conductor.

7. The coil component of claim 1, wherein an upper surface of the via pad includes a corner portion having a circular arc, and a straight line connecting the corner portion.

8. The coil component of claim 7, wherein the via pad includes a plurality of corner portions each having a shape of a circular arc, and any point in the circular arc has a constant radius of curvature.

9. The coil component of claim 1, wherein a center portion of the support member has a through-hole penetrating through the support member.

10. The coil component of claim 9, wherein the through-hole is filled with the magnetic material.

11. The coil component of claim 9, wherein the through-hole is connected to the recess portion to form a single hole.

12. The coil component of claim 1, wherein the via pad of one of the first and second conductor patterns has a line width greater than line widths of other portions of the first and second conductor patterns and a width of the via conductor measured in a line width direction of the via pad.

13. A coil component, comprising:

a body portion including a magnetic material;

a support member disposed in the body portion; and first and second conductor patterns disposed on both sides of the support member, opposing each other, wherein the support member has a protrusion portion protruding from a side surface of the support member and a recess portion disposed in the protrusion portion, a via conductor is disposed in the recess portion and connects the first and second conductor patterns to each other, each of the first and second conductor patterns includes a via pad disposed in an end portion thereof to connect the first and second conductor patterns to the via conductor, the via conductor has a first side surface which is in contact with an inner wall of the recess portion, and a second side surface which is in contact with the body portion, the first and second side surfaces extending in a stacking direction, and the second side surface of the via conductor includes a flat surface.

* * * * *